(12) United States Patent
Miller et al.

(10) Patent No.: US 9,100,721 B2
(45) Date of Patent: Aug. 4, 2015

(54) ADVERTISEMENT INSERTION

(71) Applicant: Cable Television Laboratories, Inc., Louisville, CO (US)

(72) Inventors: Edward Miller, Superior, CO (US); Stephen Glennon, Lafayette, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 14/098,631

(22) Filed: Dec. 6, 2013

(65) Prior Publication Data

US 2014/0165095 A1 Jun. 12, 2014

Related U.S. Application Data

(60) Provisional application No. 61/734,036, filed on Dec. 6, 2012.

(51) Int. Cl.
| | |
|---|---|
| *H04N 7/10* | (2006.01) |
| *H04N 7/025* | (2006.01) |
| *H04N 21/81* | (2011.01) |
| *H04N 21/435* | (2011.01) |
| *H04N 21/44* | (2011.01) |
| *H04N 21/858* | (2011.01) |

(52) U.S. Cl.
CPC ........... *H04N 21/812* (2013.01); *H04N 21/435* (2013.01); *H04N 21/44016* (2013.01); *H04N 21/858* (2013.01)

(58) Field of Classification Search
CPC ....................... H04N 21/812; H04N 21/44016
See application file for complete search history.

(56) References Cited

U.S. PATENT DOCUMENTS

| | | | | |
|---|---|---|---|---|
| 6,487,721 | B1* | 11/2002 | Safadi ............................. | 725/36 |
| 2004/0261100 | A1* | 12/2004 | Huber et al. .................... | 725/32 |
| 2010/0272419 | A1* | 10/2010 | Wang et al. .................... | 386/124 |
| 2011/0099599 | A1* | 4/2011 | Rusch-Ihwe et al. .......... | 725/117 |

* cited by examiner

*Primary Examiner* — Joshua Taylor
(74) *Attorney, Agent, or Firm* — Great Lakes Intellectual Property, PLLC

(57) ABSTRACT

Insertion of an advertisement within a television program or other media/content is contemplated. The advertisement insertion may be achieved when the media/content is originally transported with advertisement avails or other portions designated for advertisement insertion and those portions are difficult to discover, unknown, removed, obfuscated and/or generally inaccessible to a client facilitating play of the media/content.

16 Claims, 5 Drawing Sheets

ADVERTISEMENT INSERTION

CROSS-REFERENCE TO RELATED APPLICATIONS

This application claims the benefit of U.S. provisional Application No. 61/734,036 filed Dec. 6, 2013, the disclosure of which is incorporated in its entirety by reference herein.

TECHNICAL FIELD

The present invention relates to advertisement insertion, such as but not necessarily limited to facilitating the insertion of advertisements during playback of a television program or other media/content when advertisement avails or other markers associated with suitable positions to insert advertisements are difficult to discover, unknown, removed, obfuscated and/or generally inaccessible to a client facilitating playback.

BACKGROUND

American National Standard (ANSI)/Society of Cable Telecommunications Engineers (SCTE) 35, entitled Digital Program Insertion Cueing Message for Cable, the disclosure of which is hereby incorporated by reference in its entirety, was developed to support splicing Moving Pictures Expert Groups (MPEG) streams for the purposes of digital program insertion. While the present invention is not limited to MPEG, MPEG-2, MPEG-4 or any other transport stream platform, the use of cueing messages, such as but not limited to those described in ANSI/SCTE 35, to identify avails or other portions of television programs or other media/content as being amenable to digital program insertion is illustrative of a scenario where broadcasters or other originators of content format transport streams, signaling, etc. to facilitate program insertion at designated intervals. In the case of facilitating television program broadcasting, for example, the sourcing broadcaster may use such cues to designate advertisement avails or other time space where digital program insertion may be desirable, e.g., portions of the broadcasts having advertisement related video frames or blanks awaiting advertisement to be inserted.

Cable television providers, multiple system operators (MSOs) and other system/data providers, such as but not limited to Internet service providers (ISPs), voice over Internet protocol (VoIP) service providers, cellular telecommunications service providers, etc., may rely upon the cues or other information included within the transport stream by the broadcaster to identify insertion opportunities. Such providers may insert advertisements or other desired contented within the corresponding avails prior to subsequently transmitting related transport streams/signaling to their customers, i.e., to provide digital insertion at locations downstream of the broadcasters and upstream of the customers. The ability to facilitate advertisement insertion or other digital program insertion at locations upstream of the customers may be beneficial in commonly transmitting the insertions to multiple customers, e.g., each customer connected to a common tap/trunk or wireless network may receive the same insertions. While this capability may be beneficial in some cases, one non-limiting aspect of the present invention contemplates a need to provide a more granular or customer specific capability for inserting advertisements or performing other digital program insertion. The present invention contemplates achieving this by facilitating insertions at a customer premise or other location downstream of the server provider or other entity performing insertions downstream of the broadcasters, such as at a client or other device used to support customer-side access to service provider originating transport streams.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
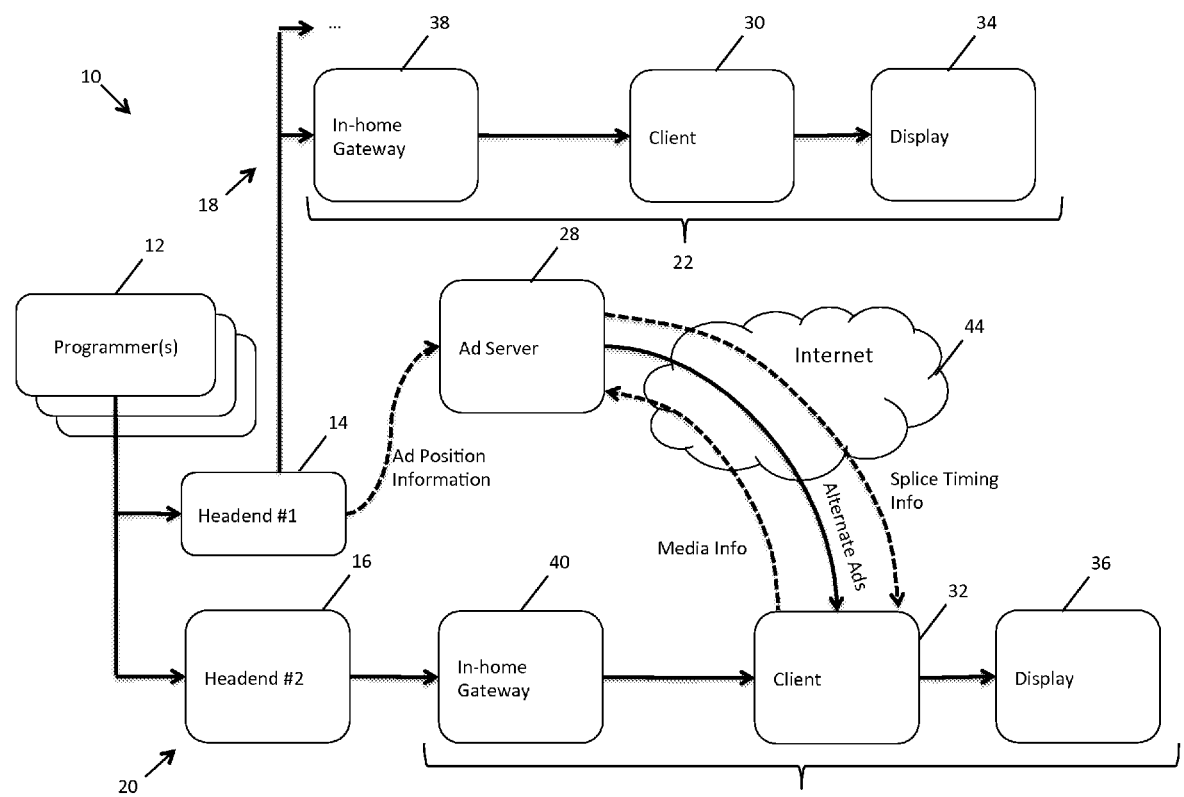
FIG. 1 illustrates an advertisement insertion system as contemplated by one non-limiting aspect of the present invention.

FIG. 1 illustrates an advertisement insertion system 10 as contemplated by one non-limiting aspect of the present invention. The system 10 relates to facilitating customer-side advertisement insertion or other digital program insertion, such as during playback of a television program or other media/content. The system 10 is predominantly described with respect to facilitating advertisement insertion during television programs for exemplary non-limiting purposes as the present invention fully contemplates its use and application in facilitating advertisement insertion for virtually any type of video, audio, etc. and/or facilitating non-advertisement related insertion of content, information, data, programs, images, etc. The system 10 illustrates a scenario where a programmer(s) or broadcaster(s) 12 originally source a television program to a first headend 14 and a second headend 16 for subsequent transmission over a first network 18 and second network 20 used to deliver services to a first customer premise 22 and a second customer premise 24. The first and second networks 18, 20 may be wireline and/or wireless networks, optionally in different geographical areas, such as but not necessarily limited to hybrid-fiber cable (HFC) or cellular/Wi-Fi networks located in different time zones or geographical areas and/or in the same service area with different customers or overlapping customers.

The first and second headends 14, 16 are one type of device contemplated by the present invention to facilitate television related signaling. The headends 14, 16 may correspond with any device having capabilities sufficient to facilitate the signal processing and other operations contemplated by the present invention, which may vary depending on the content/media being transmitted and/or the capabilities of the receiving first and second networks 18, 20. The headends 14, 16, or other intermediary between the programmer and the customer premises 22, 24, may be configured to process received signaling for transport over the corresponding networks 18, 20, including capabilities sufficient to facilitate inserting advertisements or other content within television programs transmitted from the programmer 12. The first and second headends 14, 16 may transmit the same television program with different insertions in the event different service providers are associated therewith or if the same service provider delivers different advertisements to different customer premises 22, 24 (the first and second networks 18, 20 may be configured to deliver signaling to multiple customer premises and are shown for illustrative purposes with respect to delivering signals to a single customer premise). Alternatively, the headends 14,16 may transmit the same television program with the same advertisement insertions, such as in the event the headends 14, 16 are operated by a single service provider.

The system 10 may include an advertisement server 28 operable with first and second clients 30, 32 to facilitate the contemplated customer-side advertisement/program insertion. The first and second clients 30, 32 may correspond with software applications, hardware or other devices configured to facilitate interfacing signals received from respective headends 14, 16 with a display 34, 36, a user or other feature at the corresponding customer premise 22, 24. The operation of the advertisement server 28 is described for exemplary non-limiting purposes with respect to interacting with the second client 32, however, the present invention is not so limited and fully contemplates the advertisement server 28 facilitating the contemplated operations with multiple clients and/or clients located in various geographical areas and/or associated with the same or different headends 14, 16. The first and second clients 30, 32 are shown to be connected to corresponding first and second in-home gateways 38, 40. The gateways 38, 40 may be configured to facilitate processing and otherwise interfacing signaling from a corresponding one or more of the headends 14, 16 with one or more clients 30, 32 included within the related customer premise 22, 24. The gateways 38, 40 may be set-top boxes (STB), routers (the headends 14, 16 may include or be associated with the cable modem termination system (CMTS) in the event the gateways are routers), tablets, computers, cell phones, etc.

The clients 30, 32 may optionally be part of the gateways 38, 40 and/or otherwise integrated within other devices to facilitate engaging users with the television program and/or other content susceptible to advertisement insertion. The gateways 38, 30 may communicate with the clients 30, 32 through a dedicated connection, such as but not necessary limited to a cable, and/or through a wireless connection, such as but not necessarily limited to a local area network or Wi-Fi network. While the present invention fully contemplates using the clients 30, 32 to facilitate advertisement insertion or other program insertion within any signaling transmitted to the customer premise 22, 24, the present invention predominately describes facilitating advertisement insertion when the gateways 38, 40 are configured to transmit television programs to the clients 30, 32 using Internet protocol (IP) for illustrative purposes. The use of IP signaling between the gateways 38, 40 and the clients 30, 32 is highlighted as various clients 30, 32 having IP related capabilities may be disposed between the gateways 38, 40 and corresponding displays 34, 36 to supplement processing performed by the headends 14, 16 and/or the gateways 38, 40. In one example, the gateways 38, 40 may be STBs 38, 40 and the clients 30, 32 or its associated device may be disposed between the STBs 38, 40 and the displays 34, 36 to intercept or otherwise process signaling originating at the STBs 38, 40 before output to the displays 34, 36.

The use of IP signaling is also particularly contemplated as the clients 30, 32 or other devices receiving IP transmitted signaling may be limited performance devices or devices lacking access to proprietary descrambling and/or signal processing capabilities associated with service provider controlled and/or provided devices, e.g., the service provider may provide and/or retain proprietary control over the gateways 38, 40 and not the clients 30, 32, such as in the event the clients 30, 32 are customer-loaded or otherwise provided aftermarket. The clients 30, 32 may operate in accordance with the Digital Living Network Alliance (DLNA) such that they may be discoverable on an IP network or other customer premise network and operable to facilitate relatively secure communications outside proprietary communications of the service provider, such as but not necessary limited to IP communications based on Digital Transmission Content Protection (DTCP) and/or High-bandwidth Digital Content Protection (HDCP), the disclosures of which are hereby incorporated by reference in their entireties. Of course, the present invention is not necessarily limited in this manner and fully contemplates its use and application in facilitating advertisement insertion through other mechanisms and/or devices within the customer premises 22, 24 that may not be limited to and/or dependent on IP transmitted signaling and/or that may not be beyond the control of the service providers.

The advertisement server 28 is shown to communicate with the second client 32 over the Internet 44 or through other out-of-band (OOB) signaling, i.e., signaling not transmitted from the first headend (in-band (IB) signaling). The second client 32 may rely on a home network or other Internet accessible feature within the second customer premise 24 to facilitate communications with the advertisement server 28. The communications are shown to be sufficient to facilitate exchanging media information, alternative advertisements (advertisements to be inserted) and splice timing information. The media information may include information gleaned by the second client 32 as a function of processing signaling from the second gateway 40, such as by processing packet identifiers (PIDs), program map tables (PMTs), time stamps, content identifiers, video/audio frames/packets or other information/data included in a related transport stream and/or by performing recognition operations, such as by recognizing closed caption text, images or other content related to the television program. This information may be transmitted to the advertisement server 28 to facilitate identifying the television program being watched, timing information related to the playback thereof, a current viewer/user and/or other information that may be valuable in assessing/determining a suitable advertisement for insertions and parameters associated with facilitating the insertion.

The alternative advertisements may be buffered and/or transmitted to the second client 32 to facilitate the contemplated insertion, which may be performed by replacing corresponding video/audio frames, instigating playback overlays, pop-up advertisements, etc. The advertisements may be provided in whole or in part (buffered) to the second client 32 based on the media information. The splice timing information may be provided therewith in order to facilitate inserting the advertisements at desired intervals and/or according to the output capabilities of the second client 32 and/or display 36. This information, and any other information suitable to the contemplated advertisement insertion, may be referred to as insertion instructions. The insertion instructions may include timing instructions related to timing advertisement insertion, such as based on frame elapse references, time kept by a clock of the second client 32, timestamps or other suitable temporal references transmitted with the television program. The insertion instructions, and particularly the timing instructions, may be based on SCTE 35 cues or other information transmitted in-band with the television program, e.g., the second client 32 may rely upon or use the same cues used by the second headend 16 to facilitate its advertisement insertion.

The cues or other avail information provided to the service providers by the programmer 12, such as in accordance with the SCTE 35, may be used in this manner at the customer premises 22, 24 to facilitate advertisement insertion or digital program insertion. This type of client-side insertion, however, can be problematic in that it requires the clients 30, 32 or other device at the customer premises 22, 24 to have capabilities sufficient to identify the cues or other information identified by the programmer 12 and/or to include capabilities sufficient to facilitate or otherwise determine occurrence of avails or other insertion opportunities from the received transport stream. The need to identify the advertisement avails or other insertion opportunities from the received transport stream can be particularly problematic when such advertisement avails or other markers are difficult to discover, unknown, removed, obfuscated and/or effectively inaccessible to the client 30, 32 facilitating playback. Even if the client 30, 32 is capable of discovering such cues, one non-limiting aspect of the present invention contemplates the service provider associated with the second headend 16 desiring to thwart unwanted or unauthorized advertisement insertion by removing or otherwise obfuscating the programmer embedded cues from the transport stream provided to the second client 32. Accordingly, one non-limiting aspect of the present invention contemplates facilitating advertisement insertion or other digital program insertion when a client 30, 32 lacks an ability to identify cues or other information related to advertisement avails and/or when such cues are removed.

The advertisement server 28 may be configured to facilitate advertisement insertion under such conditions by providing appropriate insertion instructions to the second client 32 such that the second client 32 need not rely upon in-band cues or other advertisement related information to be transmitted from the gateway. The advertisement server 28, instead, may rely upon cues or other information identifying advertisement avails within the television program as determined by the first headend 14. In the event the first headend 14 receives the same television program as the second headend 16, the programmer determined advertisement avails specified within the television program transmitted to the first headend 14 may be the same as those specified within the television program transmitted to the second headend 16. The advertisement server 28 may leverage this information to facilitate commanding or otherwise instructing the second client 32 to insert desired advertisements during the specified avails without requiring the second client 32 to identify the avails from the SCTE 35 cues or other information embedded within the received transport stream and/or in the event such information has been effectively removed (nulled, zero, etc.) prior to transmission to the second client 32. In this manner, the advertisement server 28 may rely upon avail information provided to a different headend or a different service provider in order to facilitate advertisement insertion at an unassociated client. This capability may be particularly beneficial in allowing or enabling third parties, competitors and the like to provide advertisements over top of or in place of advertisements provided by the service provider associated with the second client 32.

Figure 2:
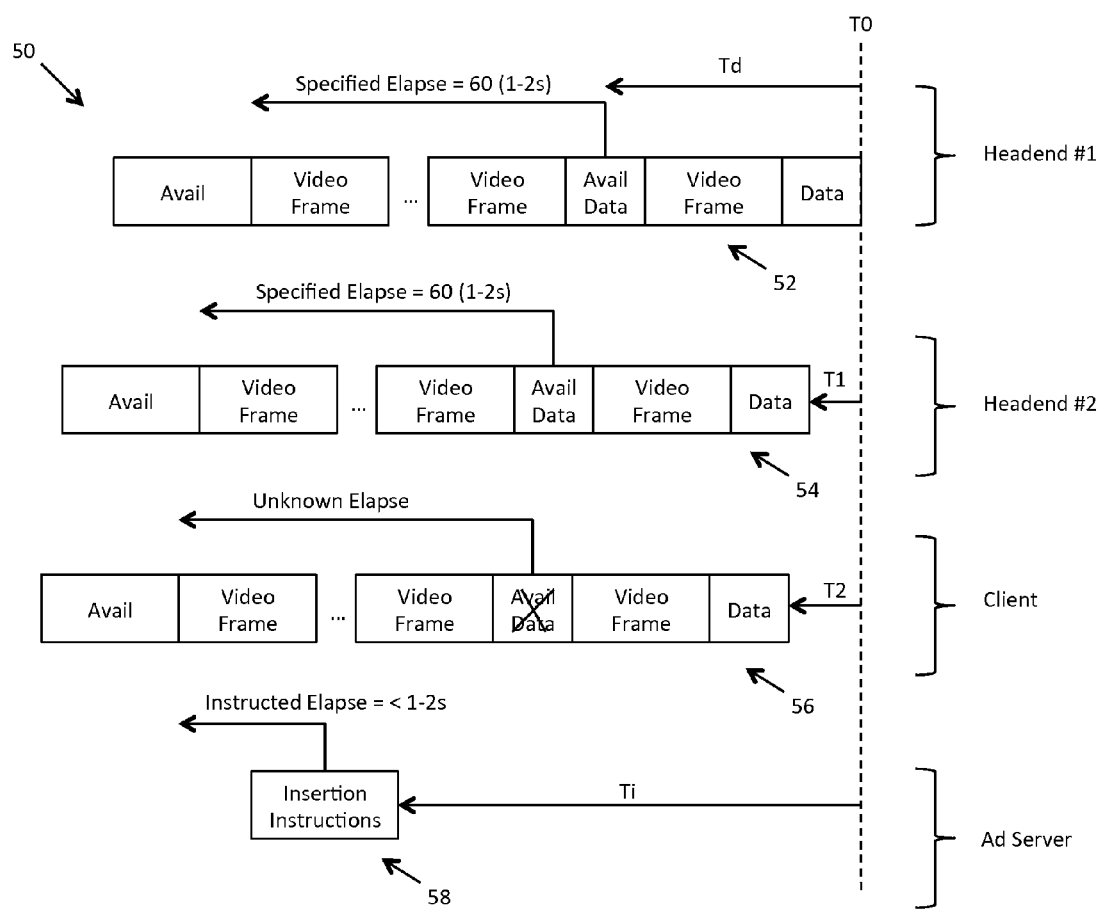
FIG. 2 illustrates a timing diagram associated with facilitating advertisement insertion in accordance with one non-limiting aspect of the present invention.

FIG. 2 illustrates a timing diagram 50 associated with facilitating advertisement insertion in accordance with one non-limiting aspect of the present invention. The diagram 50 illustrates exemplary transport streams that may be employed to facilitate transmission of the television program, including a first transport stream 52, a second transport stream 54 and a third transport stream 56. The first and second transport streams 52, 54 may correspond with those transmitted from the first and second headends 14, 16 to one or more customer premises 22, 24. The first and second streams 52, 54 may be generated as a function of a single transport stream (shown in FIG. 1) commonly transmitted to the first and second headends 14, 16 or as a function of separate transport streams (not shown in FIG. 1) independently transmitted to each of the first and second headends 14, 16. The first and second transport streams 52, 54 are shown to include the same sequence of video frame and data segments, such as in the manner associated with MPEG-2 or MPEG-4, the disclosures of which are hereby incorporated by reference in their entireties. The third transport stream 56 is shown to included the same sequence of video frames and data segments except for having the data segments used to specify advertisement avails (labeled as avail data) being removed by the second headend 16 or the second gateway 40. Third transport steam 56 may be considered as a timeless transport stream having timeless television signals in comparison to the time signaling of the first and second transport streams 52, 54 due to timing information related to the avails having been substantially removed. The removal of the avail data or other information identifying advertisement avails may be achieved by deleting the corresponding information and/or by effectively removing the information, such by zeroing/nulling the corresponding data bits (optionally maintaining the same total number of bytes), changing PIDs/PMTs, etc.

The avail data being effectively removed may be distinguished from non-advertisement data segments (labeled as data), such as those used to provided timestamps, content identifiers, frame references, etc., and the video frame segments (labeled as avail and video frame) used to convey images and/or audio being interfaced through the second client 32. The avail information may be used to identify avails or other transport stream portions having video frames embedded with advertisements or time space where advertisement may be or have been inserted. The present invention contemplates the avail data identifying avails using various temporal or spatial references and is shown for exemplary non-limited purposes with respect to identifying avails using a frame elapsed measurement. The frame elapsed measurement may identify avails and/or the segments corresponding with avails based on frame positioning within the television program, e.g., frame positioning relative to a first video frame or initial frame of the television program or relative to some other reference frame known or otherwise a identifiable. FIG. 2 illustrates the frame elapsed measurement for the first transport stream 52 based on a number of frames occurring relative to the data segment having the avail data, which is shown to indicate a next avail(s) to begin 60 video frame segments after the corresponding data segment (approximately 1 to 2 seconds later if the client outputs video frames at 60 Hz or 30 Hz).

The second transport stream 54 is shown to include the same frame elapsed measurement for the same/corresponding avail due to the programmer either transporting the same transport stream to both headends 14, 16 or separate transport streams having the same avail spacing. This may correspond with the scenario described above where the headends 14, 16 may insert different advertisements within the same avails or same portion of the television program (or more particularly between the same video frames transmitting non-advertisement related content/video). The third transport stream 56 is shown to exclude the frame elapsed measurement for the same/corresponding avail due to the second gateway 40 or second headend 16 effectively removing it. To enable insertion of an advertisement other than the advertisement inserted by the second headend 16 during the avail, the advertisement server 28 may provide insertion instructions 58 to the second client 32 sufficient to facilitate inserting the desired advertisement during the avail, i.e., during an upcoming avail unknown to the second client 32 due to the corresponding information being removed from the signals transported thereto. The insertion instructions 58 may include timing instructions or an instructed elapse sufficient to enable the client to insert an advertisement during the avail. The timing instructions may provided less advanced notice to the second client 32 than the client would otherwise if the avail data was not removed due to the time taken to generate the insertion instructions 58.

The insertion instructions 58 may be generated by the advertisement server 28 as a function of messaging received from the first headend 14 following processing of the transport stream received from the programmer 12. The first headend 14 may be configured to identify each avail within the television program based on the in-band avail data segments and re-transmitted as part of the first transport stream 52. The processing performed at the first headend 14 may enable avail information to be transmitted to the advertisement server 28 such that the advertisement server 28 may then use the received information to facilitate providing insertion instructions 58 to a client 32 facilitating playback of the same television program (program having the same avail spacing). The time taken to generate the corresponding insertion instructions 58 may cause the insertion instructions 58 to arrive at the second client 32 at a later point in time than the instructions would if not removed from the third transport stream 56. If the timing instructions are based on frames elapsing from receipt of the instructions, the insertion instructions may specify occurrence of the avail relative to receipt, e.g., after 15 frames have elapsed or 0.5-1 seconds. The media timing information may used to assess a currently viewed video frame or other temporal reference sufficient to identify a current playback position of the television program at the second client 32 in order to ensure proper timing references provided.

The advertisement server 28 may use the playback timing information to generate an offset value sufficient to identify a lag or time delay between the first transport stream 52 and the second transport stream 54. This offset may be used to facilitate generation of the timing instructions in order to insure time-depending avail identification are properly performed relative to a clock of the second client 32 or as measured from receipt of the corresponding insertion instructions. The diagram illustrates transport stream delays between the first transport stream (T0), the second transport stream (T1) and the third transport stream (T2). The time offsets T1 and T2 may reflect processing, transmission and other related delays incurred in facilitate delivery of the corresponding transport streams. The delay associated with the advertisement sever 28 following occurrence of the avail data segment may correspond with a difference between when the first transport steam transmits the avail data (Td) and when the second client 32 receives the corresponding insertion instructions (Ti). Alternatively, the second client 32 may include capabilities to perform frame tracking/counting such that the timing instructions may instead be tied to less time-depending variables, such as a number of frames elapsing from a beginning or first video frame segment of the television program or other readily identifiable frame benchmark.

Figure 3:
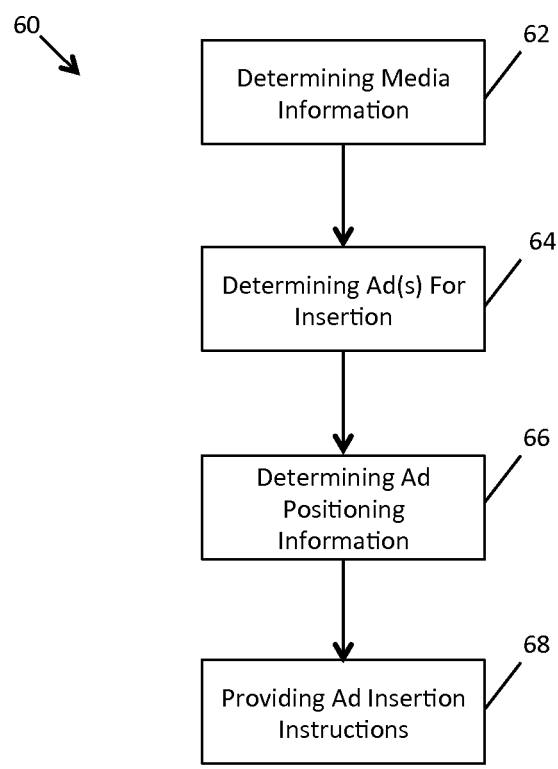
FIG. 3 illustrates a flowchart of method for advertisement insertion as contemplated by one non-limiting aspect of the present invention.

FIG. 3 illustrates a flowchart 60 of method for advertisement insertion as contemplated by one non-limiting aspect of the present invention. The method may be embodied in a computer-readable medium having non-transitory instructions embedded thereon and operable with a processor of an advertisement server or other device to facilitate the operations contemplated herein. The method is predominately described with respect to facilitating advertisement insertion during play of a television program. This exemplary description is provided without necessarily intending to limit the scope and contemplation of the present invention as the present invention fully contemplates its use and application in facilitating advertisement insertion or other program insertion during play of other media/content besides just television programs. The method may be particularly suitable to facilitating program insertion when avail information is effectively removed from signaling transported to the device interfacing a television program, such as when a service provider associated with an interfacing device (client) desires to thwart a third-party or other entity from identifying avails or other time space where advertisements may be inserted by removing cues or other avail identifiers. The present invention, however, is not necessarily so limited and fully contemplates facilitating advertisement insertion when such cues or avails are available to the client.

Block 62 relates to determining media information. The media information may be transmitted from the client to the advertisement server in order to identify a television program currently being viewed and/or related information associated with timing or other parameters attendant to the playback thereof. The media information may optionally be devoid of information related to avails or other time space detected by the client as being suitable to facilitate advertisement insertion, thereby eliminating a need for the client to recover avail related information from the received transport stream and/or other signaling used to transport the television program, which as noted above may be removed from the signaling transmitted to the client. Block 64 relates to the advertisement server determining ads suitable for insertion. The advertisement(s) determined to be suitable for insertion may be based on a user associated with the client and/or the content or other information related to use the television program. Once the advertisements are determined, the advertisements may be pre-loaded or stored at the client prior to occurrence of an avail scheduled for insertion and/or the advertisements may be buffered at the client. The buffering of advertisements may be preferred if the client includes limited memory as a buffered portion of the advertisement can begin playing when the avail starts, thereby enabling the remaining portion of the advertisement to be downloaded while the advertisement is being played instead of having to be entirely stored on the client.

Block 66 relates to determining advertisement positioning information. The advertisement server may determine client positioning information for the television program being played at the client based on information provided from an entity other than the entity transmitting the television program to the client. The use of a second source for the advertisement positioning information may be particularly beneficial in scenarios where the avail information or other cues have been removed from the television program as received at the client. Once the ad positioning information is determined for a particular television program, the advertisement server may use that information to facilitate selecting the advertisements to be inserted during any one or more of the avails included within the television program. The advertisement server may generate a schedule for the television program where advertisements and corresponding insertion instructions may be timed for delivery to the client application in Block 68. One non-limiting aspect of the present invention contemplates the advertisement server being unable to identify all of the avails expected to occur during a television program a priori or before the television program is broadcasted. This may occur, for example, if a live event is being broadcasted such that the avails are not pre-determined or otherwise scheduled prior to the broadcasts.

Block 68 may relate to providing the advertisement insertion instructions following detection of each data segment having avail information. In the scenario illustrated in FIG. 2, this may correspond with the advertisement server repeatedly receiving avail information from the first headend as the first headend processes the transport stream from the programmer and/or issues the first transport stream, e.g., in response to detecting the sequential positioning of multiple, spaced data segments having avail information. Accordingly, the processes of Blocks 66, 68 associated with determining advertisement positioning and providing advertisement insertion instructions may be repeatedly performed during the broadcast of the television program upon detecting occurrence of each data segment having avail information. The advertisement server may transmit new advertisements and new insertion instructions at intervals approximating the intervals at which the first headend detects data segments having avail information. The advertisement insertion instructions may be delayed such that the advertisement server may be required to provide/generate offset timing instructions different from those provided to the first headend or other entity detecting the avails. Of course, if the avail information specifies elapsed measurements that are independent of such delays, e.g., frame-based references, such information may be included within the advertisement instructions provided to the client.

Figure 4:
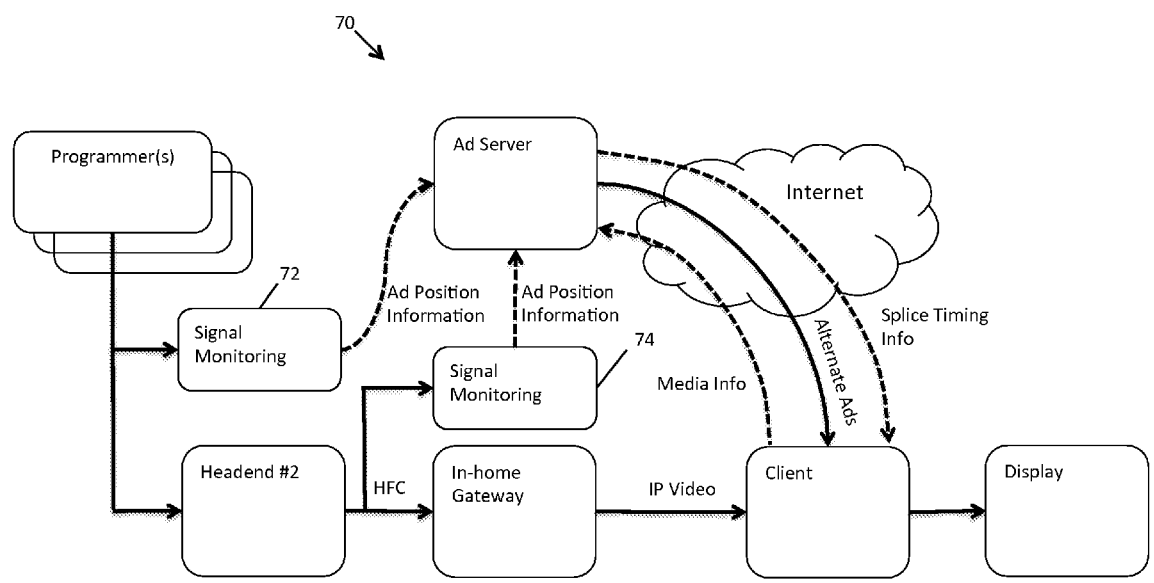
FIG. 4 illustrates an advertisement insertion system as contemplated by one non-limiting aspect of the present invention.

FIG. 4 illustrates an advertisement insertion system 70 as contemplated by one non-limiting aspect of the present invention. The system 70 may operate similarly to the system 10 described above with respect to FIG. 1 such that the devices having corresponding labels may perform similarly those described above. The system 70 of FIG. 4 differs from the system 10 at least in that the first headend has been replaced with a signal monitoring device 72. The signal monitoring device 72 may be a device lacking the capability of a headend or other device used to generate transport streams for use with downstream connected devices. The signal monitoring device 72 may be a device have capabilities sufficient to facilitate intercepting or otherwise capturing signaling transmitted from the programmer to the second headend. The signal monitoring device may be configured to identify advertisement avails or other time space suitable to facilitate advertisement insertion. The signal monitoring device may provide corresponding information to the advertisement server in order to facilitate inserting advertisements in the manner described above. Optionally, in addition to or in place of the signal monitoring device 72, a second signal monitoring device 74 may be included to perform similar operations based on the second transport stream issued from the second headend.

One non-limiting aspect of the present invention contemplates the signal monitoring devices 72, 74 having capability sufficient to facilitate determining SCTE 35 cues or other in-band avail related information transmitted from the programmers and/or the second headend. One non-limiting aspect the present invention also contemplates the signal monitoring devices 72, 74 lacking such capabilities and instead having capabilities sufficient to facilitate estimating occurrence or otherwise guessing as to occurrence of advertisement avails. The signal monitoring devices 72, 74 may be configured to estimate when advertisement avails or related time space occurs by processing the corresponding video frames in order to identify characteristics indicative of advertisements avails. The programmers may include video frames having advertisements during the advertisement avails in order to ensure the television program includes advertisements, which may be subsequently replaced by the second headend or other entity downstream. The advertisements related video frames may include characteristics that differentiate themselves from the non-advertisement related video frames, such as but not necessary limited to a sudden change in dialogue, content, etc. The signal monitoring devices may be configured to detect these events and to notify that advertisement server that an advertisement avail is occurring. That advertisement server may use this information to then provide appropriate advertisement insertion instructions to the client if advertisement insertion is desired.

In the event the avail estimation completes before the corresponding avail actually occurs at the client and/or based on information gleaned before the avail (e.g., from frames occurring sufficiently prior), the advertisement insertion instructions may be provided to the client sufficiently in advance thereof so as to provide seamless insertion and playback of the inserted advertisement. In the event the event the avail estimation completes an insufficient amount of time before the avail actually occurs at the client, the advertisement insertion instructions may be generated with temporal offset or other markers sufficient to facilitate inserting the advertisement following completion of a portion of the advertisement already being played. The advertisement server, for example, may assume that each advertisement avail encompasses a particular number of video frames during which multiple advertisements may take place. This assumption as to the length of the advertisement avail and/or the number of advertisements to take place during the avail may be defined according to advertisement standards or otherwise assumed by the advertisement server. The assumption may be sufficient to enable the advertisement server to schedule insertion of an advertisement without disrupting playback by seamlessly beginning playback of the inserted advertisement at a point in time assumed to correspond with a conclusion of a preceding advertisement (advertisement detected with the signal monitoring device).

Figure 5:
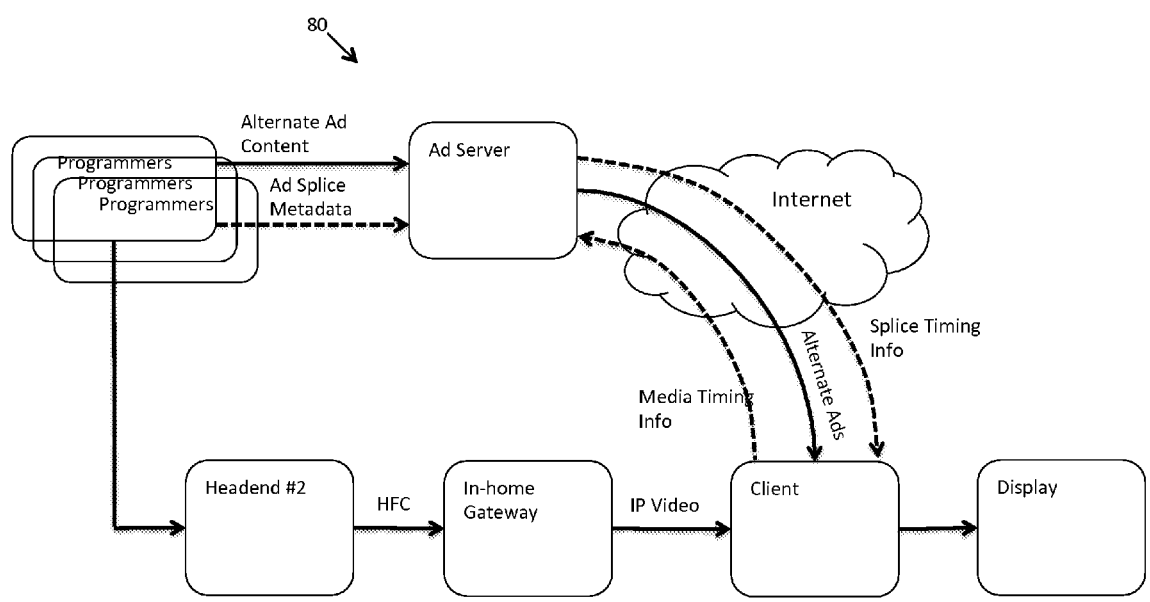
FIG. 5 illustrates an advertisement insertion system as contemplated by one non-limiting aspect of the present invention.

FIG. 5 illustrates an advertisement insertion system 80 as contemplated by one non-limiting aspect of the present invention. The system 80 may operate similarly to the system 10 described above with respect to FIG. 1 such that the devices having corresponding labels may perform similarly those described above. The system a may differ from FIGS. 1 and 4 at least in that the first headend and the signal monitoring devices are eliminated. Instead, the advertisement server relies upon avail information being provided directly from the programmers. The direct transmission of the avail information may be beneficial in allowing the ad server to determine each of the avails occurring during a pre-recorded program before the program is broadcasted and/or to determine avails occurring during a live program essentially simultaneously with the programmers transmitting the corresponding data segment within the transport stream having such avail information. The advertisement server may then facilitate inserting advertisements as a function thereof, such as to facilitate OOB delivery of the to be inserted advertisements and related advertisement instructions. The OOB delivery may enable the client to insert the desired advertisements without having to process or otherwise recover avail information included in-band from the second headend and/or the second gateway. This capability may be beneficial with limited functioning clients lacking the capabilities or licensing/entitlements to recover SCTE 35 cues or other avail information from received signaling and/or with clients receiving signaling following the removal of such information.

As supported above, one non-limiting aspect of the present invention contemplates a system of signaling ad insertion and replacement opportunities through out-of-band means, allowing in-home ad placement and replacement. The invention may be utilized with any type of content, including cable TV content available via IP within the home through gateway or directly via IP-based delivery. This provides the opportunity for applications within the home (either from the operator or third parties) to gain revenue through replacing the broadcast ads with localized and personalized ads. Existing technology (SCTE35) used to signal ad insertion (replacement) opportunities in-band to head-ends may be leveraged without being extended to the home, such as using the delivery of the information necessary to perform in-home ad replacement and insertion through out-of-band means contemplated herein.

In one example, the programmer provides the information to the OTT Ad Server in the form of Ad Splice metadata (e.g., program and timing information) and alternate Ad content. The normal delivery of the cable TV video is from the programmer through the MSO headend, via the typical cable distribution infrastructure (HFC), and then for receipt at cable TV reception gateway in the home. This gateway converts the Cable TV signal to video delivered over IP within the home. While this example shows one delivery, the invention contemplates native IP delivery to the home through a cable modem instead of a gateway. The client application retrieves Ad Splicing information through the OOB channel (the Internet) and alternate Ads from the Ad Server. It then replaces the IP video content that was part of the regular cable TV programming with the alternate ads served from the Internet. Due to the fact that there may be variable delays in both the traditional cable (or IP) delivery of the Cable TV programming from system to system, or within the home (such as DVR time shifting), the client application may provide media timing information (Information that allows the determination of exactly what is being watched in terms of channel, program and time, or other metrics) to the Ad Server. This is to allow the Ad Server to provide real-time splice timing information or other means of synchronizing the splice timing information with the program being watched.

In one example, the delivery of Ad Splice Information and replacement Ads from the programmer is not present. In this situation, two alternatives may relate to the OTT Ad Server determining the location of Ads in the Cable TV content. One may use signal monitoring off the cable TV delivery infrastructure (HFC). Another may rely on the entity operating the OTT Ad Server to have direct access to the programmer feeds and need not use monitoring of the signals on the HFC plant to gain access to the programming content (in order to determine where the ad insert opportunities exist). In this latter case of signal monitoring many technologies may be used, including SCTE35 marker detection, as these are may present in the programmer feeds. In the former case the SCTE35 markers are likely absent from the content so other means of ad detection may need to be used. The invention may enable different models for ad insertion and replacement in the home. There are several motivators for this function, including creating personalized ads for the individual user (e.g. where the existing MSO infrastructure does not support personalized ad insertion), or to support replacement of ads on a broadcast signal (where allowed) by an unrelated third party within the home. This invention solves the problem of ad insertion/replacement where there are no signals available in-band in the broadcast content to allow a client application or device within the home to determine ad splice locations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of inserting an advertisement within a television program comprising:

converting timed television signals carrying the television program into timeless television signals, the timeless television signals corresponding with the timed television signals following advertisement positioning information included therein being nulled, zeroed or otherwise effectively removed or obfuscated within the timeless television signals in a manner sufficient to prevent use of the advertisement positioning information, the advertisement positioning information being transmitted in-band with the timed television signals by a programmer to a first geographical area to identify advertisement avails for the television program;

determining a client in a second geographical area using the timeless television signals to facilitate playback of the television program; and providing out-of-band insertion instructions to the client to facilitate inserting one or more advertisements during playback, the insertion instructions instructing the client to insert each advertisement during a corresponding one or more of the advertisement avails.

2. The method of claim 1 further comprising:

identifying at least a first avail of the advertisement avails based on processing performed on the timed television signals; and providing first insertion instructions to the client for a first advertisement to be inserted to the timeless television signals during the first avail, including providing the first insertion instructions to the client after identifying the first advertisement avail within the timed television signals.

3. The method of claim 2 further comprising identifying the first avail from processing information included within a first transport stream used to transport the timed television signals, the first transport stream including a sequence of video segments and data segments, wherein a first data segment of the data segments includes the advertisement positioning information identifying the first avail, the first avail corresponding with one of the video segments occurring after the first data segment.

4. The method of claim 3 wherein the timeless televisions signals are transported to the client in a second transport stream having the first data segment with the advertisement positioning information included therein for identifying the first avail being nulled, zeroed or otherwise effectively removed or obfuscated in a manner sufficient to prevent the client from determining the first avail from the first data segment.

5. The method of claim 4 wherein the second transport stream is transported to the client from a device receiving the first transport stream, the device being configured to effectively remove or obfuscate the advertisement positioning information included in the first transport steam for the first avail prior to transporting the second transport stream to the client.

6. The method of claim 4 wherein the second transport stream is transported to the client from a first device receiving a third transport stream from the programmer, the programmer also transporting the third transport steam to a second device configured to transport the first transport stream separately from the third transport stream.

7. The method of claim 6 wherein the third transport stream includes at least one video segment having content different from the video segments of the first transport stream.

8. The method of claim 4 further comprising providing the first insertion instructions to client after the client receives the first data segment through the second transport stream, including specifying an offset within the first instructions sufficient to time insertion of the first advertisement relative to a delay associated with client receiving the first data segment and thereafter receiving the first insertion instructions.

9. The method of claim 8 further comprising providing the first insertion instructions to the client after the client receives at least 15 video segments following the first data segment.

10. The method of claim 3 wherein the timeless television signals are transported to the client within a second transport stream that includes the video segments and at least the first data segment included within the first transport stream, the advertisement positioning information within the first data segment identifying the first avail being removed from or obfuscated within the second transport stream.

11. The method of claim 1 further comprising including timing instructions with the insertion instructions sufficient for the client to determine insertion timing for one or more of the advertisements to be inserted without having to process the removed or obfuscated advertisement positioning information included in the timeless television signals.

12. The method of claim 11 further comprising generating the timing instructions to specify when the corresponding advertisement is to be inserted relative to a number of video frames measured from a reference video frame of the television program.

13. The method of claim 11 further comprising generating the timing instructions to specify when the corresponding advertisement is to be inserted relative to time measurable independently of the television program with a clock associated with the client.

14. A computer-readable medium having non-transitory instructions, operable with a processor, to facilitate inserting an advertisement within a television program, the computer-readable medium comprising non-transitory instructions sufficient for:
determining a first client in a first geographical area processing a first transport stream to facilitate playback of the television program, the first transport stream having a first plurality of video segments;
determining a plurality of advertisement avails for the television program based on avail information carried within a second transport stream transported to a second client in a second geographical area to facilitate playback, the second transport stream having the first plurality of video segments included in the first transport stream;
providing first insertion instructions to the first client to facilitate inserting a first advertisement during playback of the first transport stream, the first insertion instructions instructing the first client to insert the first advertisement during a first avail of the plurality of advertisement avails determined from avail information carried within the second transport stream, thereby instructing the first client in the first geographical area to insert the first advertisement as a function the avail information transported to the second geographical area; and
determining the plurality of avails from one or more message transmitted from a headend, the headend converting the second transport stream into the first transport stream such that the avail information included within the second transport stream is nulled, zeroed or otherwise effectively removed or obfuscated within the first transport stream in a manner sufficient to prevent the first client from relying upon the avail information to determine advertisement avails.

15. The computer-readable medium of claim 14 further comprising non-transitory instructions sufficient for:
determining the avail information carried within the second transport stream to specify a first elapsed measurement for the first avail, the first elapsed measurement specifying when the first avail is to occur within the second transport stream; and
generating the first instructions to include a second elapsed measurement for specifying when the first client is to insert the first advertisement during playback, the second elapsed measurement being different than the first elapsed measurement.

16. A computer-readable medium having non-transitory instructions, operable with a processor of an ad server, to facilitate inserting an advertisement within a television program, the computer-readable medium comprising non-transitory instructions sufficient for:
determining a client in a first geographical area processing a plurality of video frames carried in a first transport stream to facilitate playback of the television program, the client being unable to identify a plurality of advertisement avails available for inserting advertisement during the television program from avail information included within the first transport stream;
receiving timing information from the client generated as function of temporal references associated with one or more of the plurality of video frames previously processed for playback;
providing insertion timing instructions to the client sufficient to time insertion of one or more advertisements during one or more of the plurality of advertisement avails as a function of the timing information, thereby enabling the client to insert one or more advertisements during playback of the television program without having to process the avail information included within the first transport stream;
generating the timing instructions to time insertion of the one more advertisement at the client as function of an avail schedule specified by a programmer sourcing the plurality of video frames in a second transport steam to a headend located in a second geographical area, the headend subsequently converting the second transport stream into the first transport stream for transport to the client, including converting the second transport stream into the first transport stream such that the avail schedule included within the second transport stream is nulled, zeroed or otherwise effectively removed or obfuscated within the first transport stream in a manner sufficient to prevent the client from relying upon the avail schedule to determine the advertisement avails.

* * * * *